United States Patent
Månsson

[11] Patent Number: 6,021,619
[45] Date of Patent: Feb. 8, 2000

[54] CHANNEL MOULDING

[76] Inventor: Lars-Eric Månsson, Taggsvampen 1, S-403 40 Mölnlycke, Sweden

[21] Appl. No.: 08/734,038

[22] Filed: Oct. 18, 1996

Related U.S. Application Data

[63] Continuation of application No. PCT/SE95/00424, Apr. 18, 1995.

[30] Foreign Application Priority Data

| Apr. 18, 1994 | [SE] | Sweden | 9401297 |
| Oct. 28, 1994 | [SE] | Sweden | 9403693 |

[51] Int. Cl.⁷ ........................................... E04C 2/38
[52] U.S. Cl. ................... 52/716.1; 52/718.01; 52/220.3; 52/220.7; 52/220.8; 52/302.3
[58] Field of Search ................... 52/716.1, 716.6, 52/718.01, 220.3, 220.7, 220.8, 302.3

[56] References Cited

U.S. PATENT DOCUMENTS

| 3,676,974 | 7/1972 | Daly | 52/716.1 X |
| 4,204,376 | 5/1980 | Calvert | 52/718.01 X |
| 4,257,203 | 3/1981 | Propst et al. | 52/242 X |
| 4,593,505 | 6/1986 | Russell | 52/242 X |
| 4,614,838 | 9/1986 | Sandstrom | 52/287.1 X |
| 4,730,432 | 3/1988 | Schafer et al. | 52/716.1 |
| 5,274,972 | 1/1994 | Hansen | 52/718.01 X |
| 5,598,681 | 2/1997 | DiGianni | 52/718.01 X |

*Primary Examiner*—Carl D. Friedman
*Assistant Examiner*—W. Glenn Edwards
*Attorney, Agent, or Firm*—Oppedahl & Larson LLP

[57] ABSTRACT

Molding (11), such as floor base, dressing of a door, cornice, wainscot or the like, which is provided with a channel (13) extending in longitudinal direction of the molding, designed for receiving and hiding cables (12), wires or the like. The channel (13) at least along one edge of the moulding is provided with a longitudinal opening of the channel, which is closable by means of a cap fillet (15), which is at least partly insertable in the opening, and which includes at least a compressible and/or elastic yielding part (18 and 22, respectively).

14 Claims, 2 Drawing Sheets

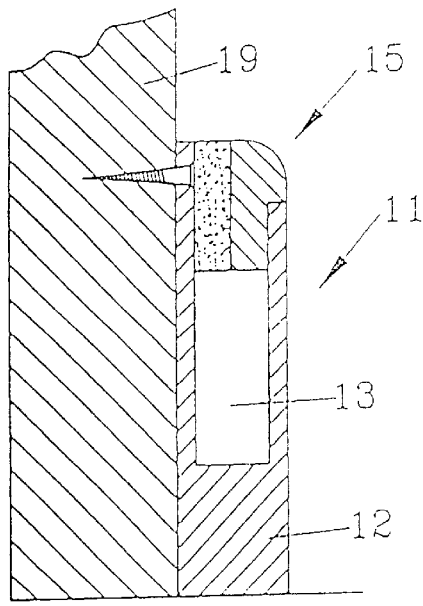
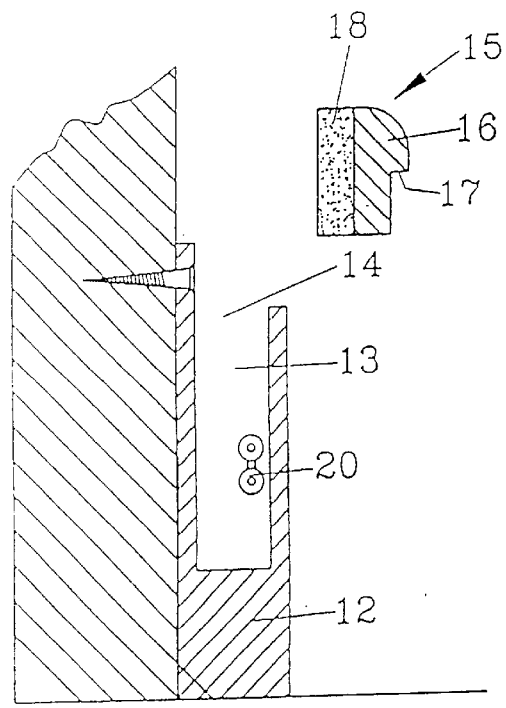
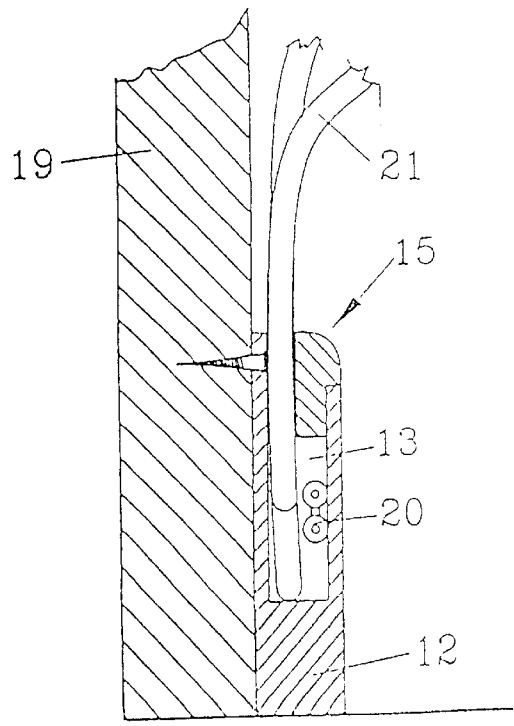
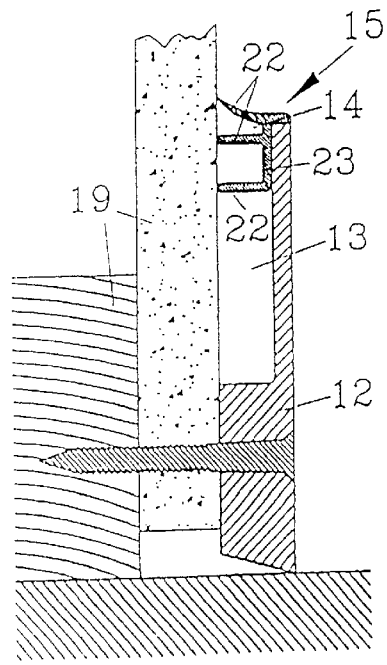

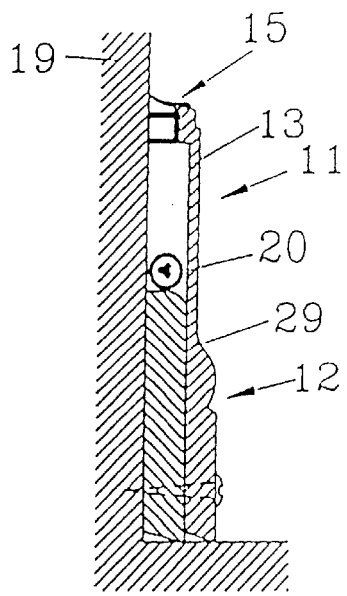
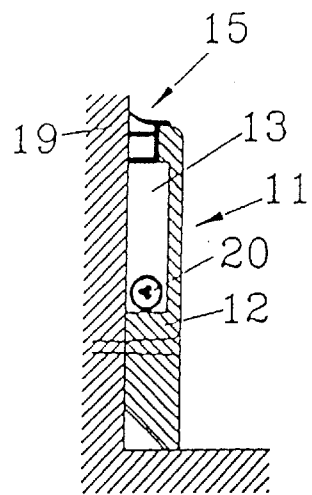
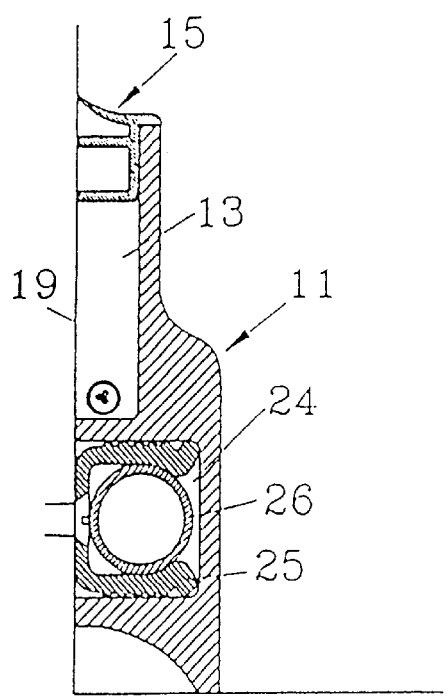
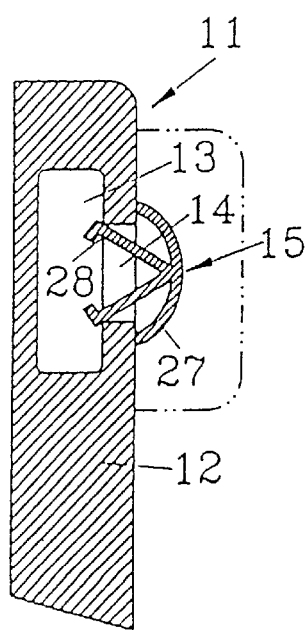

CHANNEL MOULDING

This application is a continuation of PCT patent application Ser. No. PCT/SE95/00424 filed Apr. 18, 1995 designating the United States, which application is incorporated herein by reference.

The present invention refers to a moulding, e.g. floor base, dressing of a door, cornice, wainscot or the like, which is provided with a channel extending in the longitudinal direction of the moulding, which channel is designed for receiving and hiding cables, wires or the like.

BACKGROUND OF THE INVENTION

Mouldings provided with channels of above-mentioned type are known earlier, which consist of an extruded plastic profile, which is snapped firmly onto holders, firmly screwable on the wall, which in turn are formed with brackets for rigid bracing of the cable. One drawback with these mouldings is that if the cable should be led out of its place in the channel, either a notch must be cut out in the profile edge or a groove must be cut in the wall, through which the cable can be drawn. Wiring is often a temporary measure, as one wants to be able to change when refurnishing or at changed circumstances, and then the said grooves in the profile or channels on the wall are permanent measures, which one cannot make undone.

SUMMARY OF THE INVENTION

Accordingly, the problem is to provide a moulding, which on one hand receives and hides a cable or the like, and on the other hand makes it possible to lead said cable out of the channel without tampering with the moulding or the wall. The problem has been solved through providing a channel this is open, at least along one edge side of the moulding, and that the channel opening is closeable by means of a cap-fillet, which is at least partly insertable in the opening including at least one compressible and/or resilient yielding portion.

DESCRIPTION OF THE DRAWINGS

In the following the invention will be described in detail referring to the drawings, which show some embodiments.

FIG. 1 shows a section through a floor dressing moulding according to the invention in assembled condition.

FIG. 2 shows the moulding according to FIG. 1 with removed cap board and an inserted cable.

FIG. 3 shows the moulding according to FIG. 1 with the cable pulled out of the channel.

FIG. 4 shows a section through a floor base placed against a wall according to a second modified embodiment.

FIGS. 5, 6 and 7 show a section through three other embodiments of the moulding according to the invention.

FIG. 8 shows a section through a sixth embodiment, provided with a channel opening at the flat side of the moulding.

DESCRIPTION OF THE EMBODIMENTS

The moulding, which is entirely designated with 11, according to FIGS. 1, 2 and 3, includes a base portion 12 having U-shaped cross-section, with a longitudinal channel 13 provided therein, which along one edge side of the moulding is provided with an opening 14, having the same length as the channel. In the opening of the channel 14 a cap fillet 15 can be placed, which consists of two parts, a profiled, hard part 16 with a stop edge 17 and a compressible soft part 18, which parts are suitably joined by means of a glue joint.

The moulding 11 is screwed or affixed in a suitable way to a wall 19, whereby one or more cables 20 can be placed in the open channel 13, as it is shown in FIG. 2. In an appropriate position along the moulding the cable end 21 is drawn out of the channel, as it is shown in FIG. 3 and the cap fillet 15 is placed in the opening of the channel 14, whereby the insertion depth is limited by the stop 17. Opposite to the drawn out end or ends 21 of the cable, the soft part of the cap fillet is compressed, at the same time closing the opening 14 entirely.

The difference between the moulding 15 according to the embodiments shown in FIGS. 4, 6 and 7 and the previous embodiments is that the base portion has L-shape, whereby one side-limitation of the channel is constituted of the wall 19. In these embodiments the cap fillet 15 consists of a profile fillet provided with soft flanges 22, which flexibly can fit an outgoing cable and a harder body 23 arranged with a stop 17.

In the embodiment of FIG. 5 one L-shaped shank of the base portion 12 is missing, i.e. the spacer part against the wall 19, which in this case is formed by a existing floor base or the like.

The moulding according to FIG. 7 is preferably made of a heat conducting material, e.g. aluminium, and is provided with a second longitudinal channel 24, in which pipe clips 25 are insertable, which support a heat conduction tube 26. Accordingly, the skirting board 11 acts as a heating element. Instead of the heat conduction tube an installation tube can be placed in the channel 24 and used for wiring.

The moulding of FIG. 8 has a opening of the channel 14, which is arranged in one forward flat side of the moulding. Accordingly, the channel has a T-shaped cross-section. The cap fillet can be designed with a top portion 27 and a base portion 28, the latter projecting so that it can be snapped into the longitudinal slit opening 14. Both parts can be soft or deformable, in such a way that they can fit an outgoing cable. This type of moulding is suitable when a socket, a circuit breaker or the like is to be mounted on the moulding.

Preferably, the material of the channel is MDF-board, wood, plastics or aluminum. The material of the cap fillet according to FIGS. 1–3 can be solid board and foam plastic, while in the regaining embodiments the flanges 22 of the profile moulding are of softened PVC and the body 23 of stiff PVC.

The moulding, according to the invention eliminates dust collecting cables on the floor and walls, which simplifies the cleaning, whereby larger free surfaces are obtained at the same time, as well as increased option of furnishing.

I claim:

1. A moulding for receiving and hiding wires adjacent to a surface comprising:
   (a) a base member, said base member defining a longitudinal channel for receiving wires, said longitudinal channel having an opening extending in the longitudinal direction of the base member; and
   (b) a cap member removably insertable within the opening to form a closed channel, wherein the cap member comprises a compressible or resilient portion which can be deformed to permit random-access passage of wires into and out of the channel along its longitudinal length without alteration of the structure of the moulding.

2. The moulding according to claim 1, wherein the base member has a U-shaped cross-section.

3. The moulding according to claim 2, wherein a first shank of the U-shaped base member is shorter than a second shank of the U-shaped base member, and wherein the second shank includes means for fixing the base member to a surface along which it is disposed in an upper projecting part thereof.

4. The moulding according to claim 1, wherein the opening of the channel is disposed along a side surface of the base member.

5. The moulding according to claim 1, wherein the base member defines a second channel for receiving a pipe line.

6. A moulding for receiving and hiding wires adjacent to a surface comprising:

(a) a base member, said base member in combination with a surface along which it is disposed defining a longitudinal channel for receiving wires, said longitudinal channel having an opening extending in the longitudinal direction of the base member; and (b) a cap member removably insertable within the opening to form a closed channel, wherein the cap member comprises a compressible or resilient portion which can be deformed to permit random-access passage of wires into and out of the channel along its longitudinal length without alteration of the structure of the moulding.

7. The moulding according to claim 6, wherein the base member has an L-shaped cross-section and the base member and the surface along which it is disposed in combination form the channel.

8. The moulding according to claim 7, wherein the L-shaped base member is formed from an outer member and a spacer, said spacer being disposed between the outer member and the surface.

9. The moulding according to claim 6, wherein the cap member comprises two parts, the compressible or resilient portion and a harder portion, wherein the compressible or resilient portion is disposed between the surface and the harder portion.

10. The moulding according to claim 9, wherein the harder portion comprises a stop for limiting the extent of insertion of the cap member into the opening.

11. The moulding according to claim 6, wherein the base member has a U-shaped cross-section.

12. The moulding according to claim 11, wherein a first shank of the U-shaped base member is shorter than a second shank of the U-shaped base member, and wherein the second shank includes means for fixing the base member to the surface along which it is disposed in an upper projecting part thereof.

13. The moulding according to claim 6, wherein the base member in combination with the surface defines a second channel for receiving a pipe line.

14. The moulding according to claim 6, wherein the opening of the channel is disposed along a side surface of the base member.

* * * * *